United States Patent Office 3,150,122
Patented Sept. 22, 1964

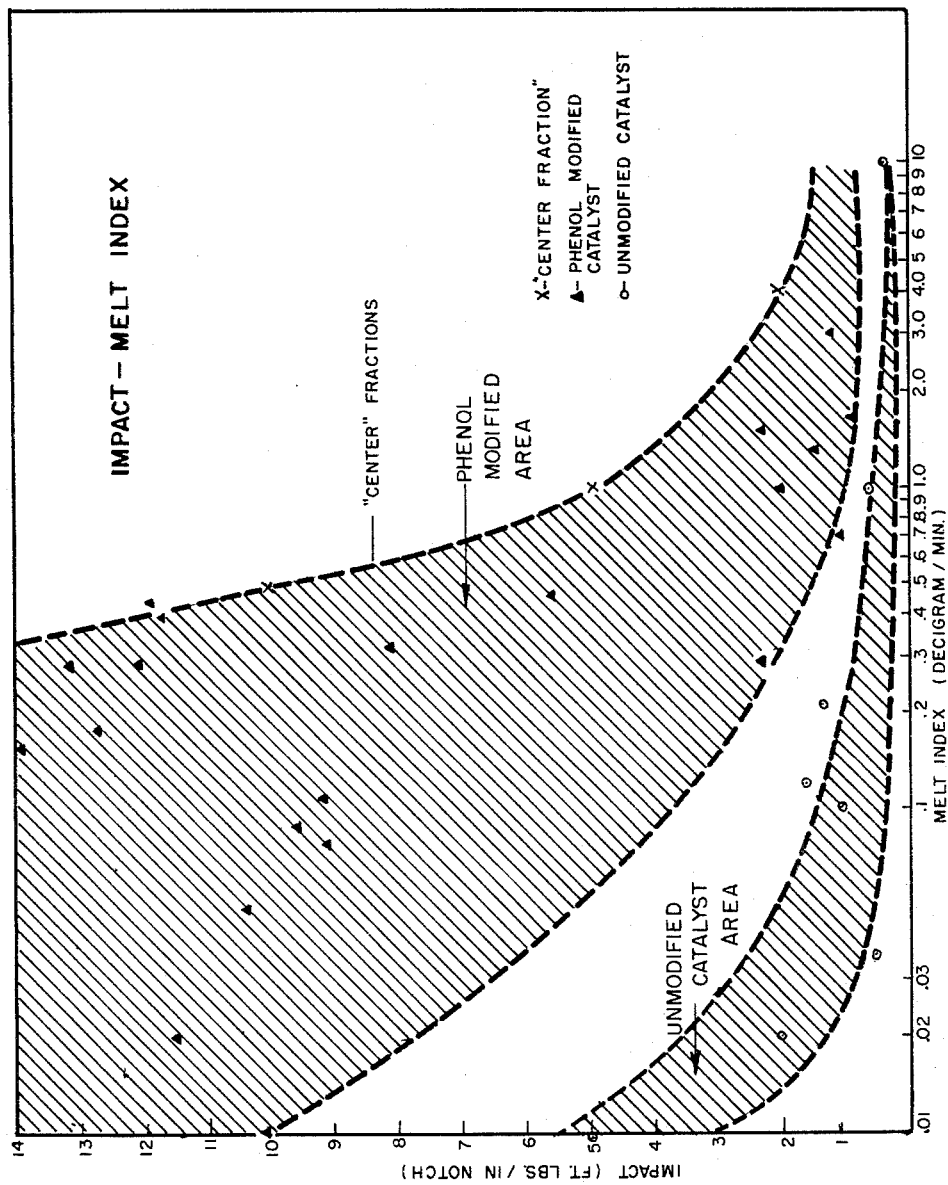

3,150,122
PRODUCTION OF HIGH-DENSITY
ZIEGLER POLYMERS
Harry M. Andersen and William R. Richard, Jr., Dayton,
Ohio, assignors to Monsanto Company, a corporation
of Delaware
Filed Nov. 7, 1957, Ser. No. 695,009
2 Claims. (Cl. 260—94.9)

This invention relates to Ziegler catalysts, to the preparation of Ziegler catalysts, and to the use of Ziegler catalysts to effect chemical reactions, especially polymerizations. In certain preferred aspects, the invention pertains to the production of high-density polyethylene by polymerizing ethylene in the presence of a catalyst exemplified by the material obtained by the interaction of a trialkyl aluminum with titanium tetrachloride, said catalyst having been especially treated to result in the production of polyethylene of improved properties over that obtainable with the same catalyst not so treated.

SUMMARY OF INVENTION

The essence of the present invention lies in the use of a phenol to modify the characteristics of Ziegler catalysts, whereby the use of such modified catalysts permits the production of improved Ziegler polymers. In a fundamental aspect, the invention involves the use of a phenol-modified Ziegler catalyst to narrow the molecular weight distribution pattern of Ziegler polymers, with consequent improvement in many properties. Of especial interest is the production of polyethylene of high density and improved impact/flow properties made possible by the practice of the invention. Of further interest is the production of polyethylene film of high optical clarity made possible by the practice of the present invention.

SIGNIFICANCE OF POLYMER DENSITY

In any polymer showing the presence of a crystalline phase by X-ray diffraction, the density is a direct function of the crystallinity, the greater the crystallinity the higher the density. High-molecular-weight polymers of ethylene, called polyethylene, are important materials of commerce, and they are partially crystalline semi-rigid polymers having great utility. By the use of certain types of catalysts advanced by Professor-Dr. Karl Ziegler, polyethylene can be made at low pressures and such polyethylene has considerably higher density—generally about 0.940 to 0.948 g. per cc., the density depending somewhat upon reaction conditions and especially on solvent, e.g., in kerosene the usual density is within the range of 0.942 to 0.947 and with heptane the usual density is about 0.948 —than polyethylene as usually made by the earlier high-pressure oxygen- or peroxide-catalyzed polymerization methods. These higher-density polyethylenes, as a result of their greater crystallinity, are much more rigid than the high-pressure polyethylenes, and have considerably higher softening and melting points. These properties made possible the improvements in the heretofore known uses of polyethylene and indicate the likelihood that the high-density polyethylenes may replace certain other thermoplastic polymers in various uses. It thus becomes clear that still further increase in crystallinity of polyethylene, which is reflected in increased density, would result in still further improvements in certain properties such as stiffness and resistance to heat. Also, increased crystallinity in polyethylene is reflected in an increased tensile yield strength which, of course, is quite desirable.

SIGNIFICANCE OF FLOW/IMPACT PROPERTIES

Although Ziegler polymers have many valuable properties, Ziegler polymers, particularly Ziegler polyethylenes, have in the past been characterized by a poor relationship of impact and flow properties. The significance of these properties and the importance of their relationship is readily apparent. The impact strength is a measure of the resistance of the material to breaking; it is obvious that high impact strength is desirable for many uses. The melt flow properties of the material indicate the ease with which the material can be induced to flow under pressure; the melt flow properties determine the ease with which the polymer can be processed by such procedures as extrusion, film blowing, etc., the more readily flowing polymers (having higher melt indices) being more readily processed in general. The present commercial Ziegler polyethylene polymers are defective in either impact strength, flow properties, or both, for many applications. Moreover, if the polymerization is adjusted by conventional means to raise the molecular weight thereby improving the impact strength, the flow properties will be adversely affected and the polymer may be completely intractable under ordinary processing conditions. Conversely, if the polymerization conditions are altered in known manner to produce a lower-molecular-weight polymer, the impact strength will be adversely affected and it will be impossible to employ the polymer in appilications requiring high impact strength.

It will be realized that the impact/flow properties are related to the density of the polymer. For impact properties are ordinarily expected to deteriorate with increasing density, if a constant melt index is maintained. Thus, it is difficult to obtain the benefits of high-density polymers along with good impact/flow properties. However, the polymers disclosed herein have good impact/flow properties at high densities, e.g., at densities as high as 0.76 or 0.97 or higher.

The present invention makes it possible to prepare polyethylenes and other polymers having both high impact strength and good flow properties. It is not possible to set any absolute limit on the desirable impact strengths and flow properties, as the requirements in this regard will depend on the application. However, it can in general be stated that in the ranges of interest for practical purposes the higher the impact strength and melt index, the better. With reference to the accompanying figure, it will be desirable that the melt indices and impact strengths of the polyethylenes be substantially to the right of or above the unmodified catalyst area, i.e., the area of ordinary Ziegler polyethylene. In the figure, which illustrates impact strengths and melt indices for low-pressure, high-density polyethylenes, values for impact strength are shown on the ordinate, and values for melt index are shown on a logarithmic scale on the abscissa. The use of the phenol modifiers and modified catalysts as disclosed in the present invention makes it possible to obtain polyethylene having a density comparable to or higher than ordinary Ziegler polyethylene, and with improved impact/flow values, for example, with values in the area of the figure designated as the phenol modified area. The phenol-modified catalyst produces polyethylenes comparable in properties to the "center" fractions obtained by fractionation of ordinary Ziegler polyethylene and represented by the "center" fractions curve in the figure. Ordinarily, the high-density polyethylenes as prepared by the methods taught herein will have impact-flow properties at the least as desirable as those contemplated by variation of the impact strength from 1 to 12 ft.-lbs. as the melt index varies from 10 to 0.02 decigrams. A melt-index range which is often practicably obtainable and useful with regard to Ziegler polyethylenes in general is about 0.4 to 2 or 3 decigrams per minute or higher and in this range the phenol modifiers of the present invention make it possible to easily obtain strengths of 1 to 2 ft.-lbs., and often produce impact strengths of 5 to 10 ft.-lbs. or more. It will be realized that the inclusion of the foregoing numerical and graphical data is not intended to limit the scope of the present invention or the scope of the application of the contemplated phenol-modified Ziegler catalyst, but rather is intended to illustrate some of the characteristic improvements in flow/impact properties which can be obtained by using the modified catalysts of the present invention.

It is believed, as will be discussed more fully below, that the improvement in flow/impact properties resulting from the use of the modified polymerization catalysts of the present invention is due to narrower molecular weight distributions in the polymers.

Various other polymers, especially those of unsaturated hydrocarbons such as propylene, butenes, styrene, and the like, can be prepared in crystalline form. It has been said that crystallinity of such polymers can result from an "isotactic" structure of the molecular, which word issued to indicate a regular arrangement of side groups along the carbon chain for at least considerable portions of the molecule. Many of the crystalline polymers of these unsaturated hydrocarbon monomers are obtained by fractionation of total polymer such as by use of one or more solvents which dissolve the amorphous or lesser crystalline portion of the polymer; thus, the heptane-insoluble polypropylene and polystyrene are more crystalline than those fractions soluble in heptane. In these polymers other than polyethylene, though crystallinity may primarily result from a regular arrangement of side groups on the chain, it also, no doubt, is somewhat dependent on the extent of branching of the chains, just as in polyethylene. Thus, increased linearity of polymer chain, whether it be polyethylene, polypropylene, polystyrene or the like, as reflected by a lessening of the branching of the chain, results in a higher degree of crystallinity with resulting improved properties as mentioned heretofore.

It can also be appreciated that the flow/impact properties of these other polymers, e.g., those of unsaturated hydrocarbons such as propylene, butenes, styrene, and the like, and copolymers of the foregoing with each other or with ethylene will benefit from a narrower molecular weight distribution resulting from use of the modified catalysts of the present invention.

While the present invention is of especial interest at the present time with respect to polyethylene in which crystallinity is almost solely a reflection of the degree and type of branching, it is applicable to all Ziegler-type polymerizations, special reference being made to the preparation of polypropylene, polybutene, 4-methylpentene, and polystyrene which are currently of the most potential interest from a commercial viewpoint.

ZIEGLER-TYPE CATALYSTS

There has recently come into commercial prominence the polymerization of ethylene and other monomers through the agency of a type of catalyst advanced by Professor-Dr. Karl Ziegler of the Max Planck Institute at Mulheim, Ruhr, Germany. Probably the preferred group of these catalysts is that disclosed in Belgian Patent No. 533,362 issued May 16, 1955, to Ziegler, the disclosure of which is hereby incorporated herein by reference, namely catalysts prepared by the interaction of a trialkyl-aluminum with a compound of a metal of Group IV-B, V-B, or VI-B of the Periodic System, including thorium and uranium, and especially compounds of titanium, zirconium, and chromium. The Groups and Periodic System as utilized herein have reference to the Periodic Chart of the Elements as it appears in Lange's Handbook of Chemistry, Sixth Edition, pages 58 and 59. These and the variety of other catalysts of the Ziegler type, can be considered exemplified by the catalysts obtained by the interaction of a trialkylaluminum with titanium tetrachloride. Other catalysts of the Ziegler type differ from those disclosed in the above-mentioned Belgian Patent No. 533,-362, in various ways, for example, as follows. Instead of or in addition to the aluminum trialkyls, catalysts of the type described in the Belgian patent can be made by reacting the various metal compounds of Groups IV-B, V-B, and VI-B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds.

The Ziegler catalyst is adapted for the low-pressure polymerization of ethylene so that when suspended in concentration of about 20 m.moles/liter (based on polyvalent metal) in a well-agitated inert solvent, it will cause an ethylene uptake rate of at least 5 grams per hour per liter of solvent.

It is generally considered that the Ziegler catalysts are obtained by interaction of a polyvalent metal compound with another metal in elemental or combined form resulting in reduction of the valence state of the first said metal. The resulting polymetal Ziegler catalyst is believed to act as a heterogeneous catalyst, i.e., at least some of the product obtained by the interaction of the materials in question is present in solid form although often in such finely divided form as to be of colloidal or subcolloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid.

The essence of the present invention, however, is not to be found in the particular Ziegler-type catalyst employed but rather in the use of a phenol in the preparation of such catalyst, with consequent advantages when used to catalyze a variety of chemical reactions, polymerization of ethylenically unsaturated monomers being of particular interest.

ZIEGLER REACTIONS AND POLYMERS

Ziegler catalysts can be employed to catalyze a variety of chemical reactions, for example, the chlorination of benzene to produce mono- and polychlorobenzenes, especially ortho- and para-dichlorobenzene. The reaction of most intense commercial interest at the present time is polymerization. The present invention is broadly applicable to all Ziegler catalysts, and their use in all chemical reactions catalyzed thereby, and insofar as polymerization is concerned, is broadly applicable to all Ziegler-type polymers, i.e., all polymers prepared by polymerizing a monomer or mixture of monomers in the presence of a Ziegler-type catalyst. A monomer which can be so polymerized can properly be called a Ziegler-polymerizable monomer. Of especial interest, of course, are those Ziegler solid polymers of sufficiently high molecular weight to be useful in the plastics industry, but benefits of the invention are obtainable in preparing lower-molecular-weight Ziegler semi-solid and even liquid polymers which can be used, for example, in adhesives, as lube oil additives, etc. The preferred polymers have a molecular weight of at least 2,000 and preferably 10,000. Those Ziegler polymers to which the preparation of the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution as described in the Journal für Praktische Chemie, 2nd Series, vol. 158, page 136 (1941) and Journal of the American Chemical Society, 73, page 1901 (1951).

At the present time, ethylene is the preferred monomer for preparing Ziegler polymers. The ethylene can be homopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Serial Number 502,008, filed April 18, 1955 and now abandoned. Also of interest are the copolymers of butadiene and/or isoprene with styrene, disclosed in the copending application of Carroll A. Hochwalt, Serial No. 501,795, filed April 18, 1955. Homopolymers of butadiene, homopolymers of isoprene, and copolymers of butadiene with isoprene, as prepared by the use of Ziegler-type catalysts are also of great interest, having exceptionally low-temperature properties, as disclosed in the copending application of Robert J. Slocombe, Serial Number 502,189, filed April 18, 1955. Other ethylenically unsaturated hydrocarbons whose Ziegler polymers are of potential interest include propylene, butylenes, especially butene-1, amylenes and the like. Substituted olefins are also of interest, such as vinyl-cyclohexene, styrene, vinylnaphthalene, vinyl aromatic hydrocarbons generally, etc. Styrene when polymerized in the presence of Ziegler-type catalysts gives a high-molecular-weight polymer showing a crystalline structure by X-ray diffraction examination. Ziegler-type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers can also be prepared by the action of Ziegler catalysts, as disclosed in the copending application of Earl W. Gluesenkamp, Serial Number 507,717, filed May 11, 1955 and now Patent No. 3,026,290. A variety of copolymers of the various monomers named above with each other and with other comonomers can be prepared by Ziegler catalysis, and the present invention in its broadest scope includes all such and, in fact, all polymers prepared through the agency of Ziegler-type catalysts on any single monomer or mixture of monomers polymerizable with such catalysts.

Despite the broad scope of the invention, it will be found more convenient in most of the present application to discuss the invention with specific reference to preferred embodiments thereof, and accordingly, Ziegler-type polyethylene will be especially referred to by way of example. Likewise, referred to especially by way of example will be catalysts prepared by the interaction of a trialkylaluminum with titanium tetrachloride, this being the prepared example of the preferred group of Ziegler catalysts which are those prepared by interaction of (a) an aluminum compound of the general formula R₂AlX wherein R is an alkyl, cycloalkyl, or aryl radical and X is hydrogen, halogen, or an alkyl, cycloalkyl, or aryl radical, with (b) a metal halide selected from the group consisting of the chlorides, bromides and iodides of titanium and zirconium.

THE INVENTION IN FURTHER DETAIL

In accordance with one embodiment of the present invention, an active Ziegler catalyst is prepared, usually but not always as a dispersion in an inert organic liquid, and there is added to such catalyst a phenol in an amount effective to beneficiate, i.e., to beneficially modify the catalyst but insufficient to destroy its activity. An alternative procedure comprises adding the phenol compound to the polyvalent reducible metal compound Ziegler-catalyst-precursor, and interacting the thus-treated precursor with a reducing agent effective to produce an active Ziegler catalyst. (The invention cannot be practiced by adding the phenol compound to the reducing agent rather than to the polyvalent reducible metal compound or to the active catalyst.) A suitable amount of a phenol will vary somewhat dependent upon the particular phenol compound, catalyst, and reaction conditions and these amounts will be discussed in detail hereinafter, but in general the amount is in the neighborhood of 0.4 to 1.0 gram-mole of the phenol per gram-atom of the multivalent metal in the metal compound that is reduced in preparing the catalyst, e.g., TiCl₄. Depending upon the circumstances, the amount may be less than 0.1 gram-mole of the phenol per gram-atom of the said metal, or the gram-moles of the phenol may be one or two or up to five or more times the number of gram-atoms of said metal. Too little of a phenol is not very effective, but on the other hand, not too much should be used or the catalyst will be deactivated, i.e., its catalytic activity will be destroyed. It appears that any amount of a phenol decreases the catalytic activity somewhat, but in some instances this is not undesirable and in other instances, in accordance with certain aspects of the invention, we readily overcome this effect partially or completely by alteration in reaction conditions, especially by imposing moderate pressure. It also apears that, in general, any amount of phenol causes a change in molecular weight of polymer obtained by use of the thus-treated Ziegler catalyst. Here again, in many instances this is not objectionable or is even desirable, while in other instances, in accordance with certain aspects of the invention, we overcome this effect partially or completely by increasing the ratio of the reducing component of the catalyst to the multivalent metal component which is reduced.

PHENOL MODIFIERS

Phenols as a class are employed in practicing the invention. By a phenol, we mean any compound having the formula Aryl-OH wherein aryl is a radical joined to —OH through aromatic carbon and is free from non-interfering substituents. Included amongst the preferred phenols are especially those having a single —OH group, and also those having a plurality such as 2 or 3 or more —OH groups, attached to aromatic carbon. While a variety of non-interfering substituents can be present, we prefer phenol per se, i.e., hydroxybenzene, and hydrocarbon-substituted phenols wherein the hydrocarbon substituents on the benzene ring of phenol may be aliphatic, alicyclic, aromatic and mixed groups such alkaryl, aralkyl, cycloalkylaryl and the like and/or the hydrocarbon substituent can be a ring fused with a benzene ring as in such compounds as the naphthols and hydrocarbon-substituted naphthols. Such compounds having additional —OH groups attached to aromatic carbon also constitute a preferred class of compounds and these can be defined as the group consisting of the monohydroxy and polyhydroxy-substituted benzenes and hydrocarbon-substituted benzenes. It is generally preferred that a phenol employed in the invention contain not over 15 carbon atoms per molecule and not over two hydroxy, i.e., —OH, groups per molecule. It may be mentioned that salts of phenols, i.e., phenols wherein sodium, calcium, ammonium, or other cation replaces the H of an —OH group, may find use, but this is seldom practical because of problems of insolubility and lack of hydrolysis to provide an active hydrogen atom of a hydroxy group.

By way of example, but not limitation, or suitable phenols that can be employed in the practice of the invention, the following are mentioned: phenol (per se); the cresols, i.e., o-, m-, and p-methylphenol and mixtures thereof; the alkylated cresols, e.g., 2,4-dimethylphenol,, 2-methyl-4-t-butylphenol, 2-t-butyl-4-methylphenol, 2-methyl-4-n-butylphenol, 2-methyl-3-sec-butylphenol, 2 - methyl-4-isobutylphenol, 3,4-dimethylphenol, 2-methyl-5-ethylphenol, 3,-5-di-t-butyl-4-methylphenol, 2-methyl-4-cyclohexyphenol, 2-methyl-4-benzylphenol; o-isopropylphenol; m-ethylphenol; p-n-amylphenol; 3-n-propyl-4-n-hexadecylphenol; 4-methoxyphenol; salicyclic acid which can also be called o-hydroxybenzoic acid; pyrocatechol which can also be called o-dihydroxybenzene; alkylated pyrocatechols, e.g., 1,2-hydroxy-4-methylbenzene, 1,2 - dihydroxy-3,5-diisopropylbenzene; the unsubstituted and substituted resorcinols, e.g., m-hydroxyphenol, m-dihydroxyphenol, m-ethoxyresorcinol; the unsubstituted and substituted hydroquinones; the unsubstituted and substituted pyrogallols, e.g., 5-ethylpyrogallol; p-hydroxybiphenyl which can also be called p-phenylphenol; hydrolysate products of mono- and polychlorinated biphenyls; α-naphthol; β-naphthol; mixed amyl naphthols; 2-hydroxyanthracene, 2,4-dichlorophenol; α-hydroxy-β-naphthol; m-(methylsulfonyl)phenol; O-(methylsulfonyl)phenol, p-(methylthio)phenol; the various phenols having substituted or aromatic carbon, one or more halogen, e.g., —Cl, —Br, —I, —F, or ester, or amide, or sulfonamide groups wherein the nitrogen of the amide or sulfonamide groups can be unsubstituted or can be substituted by one or two hydrocarbon radicals.

The amount of a phenol to be employed is best related to the amount of catalyst and will vary considerably, dependent upon the particular catalyst, its method of preparation, the particular phenol, and the extent to which catalyst modification is desired. However, the amount of a phenol to be used is always small, and an amount will be chosen effective to modify the catalyst but insufficient to decrease its activity to an undesirable extent and certainly insufficient to destroy the catalyst activity completely.

In general, it can be stated that any substantial amount of a phenol which does not completely deactivate the catalyst will have some effect in narrowing the molecular weight distribution pattern of polymer prepared with the catalyst. A Ziegler catalyst can be considered deactivated for most purposes if it is incapable when suspended in a well-agitated inert solvent in concentration of about 20 m. moles/liter (based on the multivalent metal) of causing an ethylene uptake rate of at least 1 gram per hour per liter of reactor space at 20 atmospheres pressure; it is not usually practical to use a catalyst which does not have an uptake rate of at least 5–10 grams per hour per liter under such circumstances, and it is preferable that the uptake rate be 100 grams per hour per liter or higher. When the catalyst is employed under pressure and possibly at other concentrations, it should have an uptake rate of at least 25 grams per hour per liter under the conditions of employment, and preferably an uptake rate of 100 grams per hour per liter or higher. The ethylene uptake rates for any conditions can readily be ascertained. Even though a catalyst may be inactive according to the foregoing criteria, it should be realized that it can still have activity in some reactions, and therefore the present invention in its broader aspects contemplates any phenol-modified Ziegler catalyst. The Ziegler catalysts are made up of compounds of polyvalent metals which are reduced by reducing agents, the former being exemplified by $TiCl_4$ and the latter being exemplified by trialkylaluminums. For each mole of the said heavy metal compound which is reduced, when the said compound contains one atom of metal per molecule, the amount of a phenol to be used will generally be within the range of 0.1 to 2 moles. The optimum range, and even the operable range, in a given situation may be considerably smaller than the stated broad range. In some instances, the range of optimum or operable proportions will be outside these stated ranges. However, it is a matter of the simplest of tests to determine operable and optimum quantities of any given phenol with any given Ziegler catalyst. Such test can, for example, be carried out as described in the specific examples hereinafter, and having had the benefit of the present disclosure, they are well within the skill of the art. With Ziegler catalysts prepared by the interaction of a trialkylaluminum with titanium tetrachloride, and with phenol per se, i.e., hydroxybenzene, there is almost always used an amount of said phenol within the range of from 0.1 to 1.5 moles per mole of $TiCl_4$ used, i.e., per gram-atom of titanium. It is often desirable to utilize phenol on approximately a mole per mole basis with the aluminum alkyl, e.g., from about 0.8 to about 1.5–2.0 moles phenol for each gram-atom of aluminum.

When Ziegler catalysts prepared in accordance with the present invention is used as a polymerization catalyst, the molecular weight of the resulting polymer is often lower than the molecular weight would be if a phenol had not been used in preparing the catalyst and the polymerization carried out otherwise identical conditions. In many instances, this is very desirable, as when monomer, catalyst and reaction conditions are chosen to give polymers having desirable properties but whose molecular weights are somewhat higher than desired for a given purpose. However, if it is desired to overcome the effect of the chosen phenol in lowering the molecular weight, this can be done by decreasing the aging time of the catalyst prior to addition of the phenol, or by increasing the aging time subsequent to the phenol addition. The mole ratio of a trialkylaluminum to a titanium salt used in preparing the catalyst also can be used to effect control of molecular weight, the higher ratios producing higher molecular weights. The $R_3Al/TiCl_4$ mole ratios employed are generally in the range of about 0.3:1 to 0.8:1, although a higher or lower ratio can be used, for example, 0.1:1 to 3:1 or so.

Use of a phenol tends to decrease the activity of the catalyst. As already pointed out, the amount of phenol must be limited so that this decrease in activity does not occur to an extent that is undesirable, all other things being considered, and certainly must be limited so that the catalyst activity is not destroyed. In either case, the activity of the catalyst can be noted by the rate at which ethylene is polymerized or other reaction is effected by the aid of the catalyst in a comparison of said rate with the rate where the phenol is not used and/or the said mole ratio is not increased. Decreased catalyst activity, which results in a decreased rate of reaction, can be compensated for by a change in several reaction variables such as by increasing the amount of catalyst, increasing the temperature, or increasing the pressure. We usually prefer to increase the pressure. We find that a very modest increase in pressure, say from atmospheric up to 50 or 100 or 200 pounds per square-inch gage, is usually quite sufficient to obtain adequate reaction rate. In the case of catalysts which require pressure in the first instance for a satisfactory rate of polymerization when being used to polymerize ethylene or other monomer, the pressure can be still further increased to restore the reaction rate which has decreased because of the use of a phenol and/or an increase in the mole ratio of reducing agent to polyvalent metal compounds employed in preparing the catalyst.

We ordinarily prefer to prepare an active Ziegler catalyst as a dispersion in an inert organic liquid, such as an aliphatic or aromatic hydrocarbon as will be discussed more in detail hereinafter. This dispersion is ordinarily a colloidal suspension of catalyst particles in the liquid. We then add the chosen phenol in the chosen amount, and preferably the phenol before addition is diluted somewhat with an inert organic liquid and the addition made with vigorous agitation so as to prevent localized concentration of phenol during the treatment of the catalyst therewith. It is necessary in accordance with the presently preferred practice of the invention to prepare an active Ziegler catalyst first, and then to treat same with the chosen phenol. To treat the reducing agent, such as the trialkylaluminum, first with phenol and then add the heavy metal compound, e.g., $TiCl_4$, tends to give an almost inactive or completely inactive catalyst and, furthermore, use of such a catalyst if active at all does not result in the improvements in the polymer which are desired. It is permissible but undesirable to add the phenol first to the multivalent metal compound, e.g., $TiCl_4$, prior to its interaction with the reducing agent, e.g., trialkylaluminum; an active but sticky red precipitate is produced. Ordinarily, the monomer is polymerized in the presence of the catalyst dispersion which has been treated with a phenol. However, prior to the polymerization or other use of the catalyst, part or all of the solvent may be removed as by filtration, evaporation, and the like, care being taken not to use conditions for such a separation that will deactivate the catalyst. It is also possible, if a dry catalyst or catalyst in a reduced amount of organic liquid is to be used, to prepare the active catalyst in such form prior to its treatment with a phenol. In such event, particular care must be taken to insure thorough admixture of the chosen amount of phenol with the total catalyst, and this can involve using a limited amount of inert organic liquid as a solvent and/or suspending agent for the chosen phenol, or thorough grinding as by ball milling the catalyst, either in a dry condition or with some inert organic liquid present, with the chosen phenol.

Ordinarily, it is quite sufficient and, in fact, desirable to use only a single phenol compound. However, it is not outside the scope of the invention to utilize an admixture of two or more such compounds, or in admixture of any one or more such compounds with any other catalyst modifying agent that may be desired, e.g., with the thiophenols described in copending application, Serial Number 609,798 and now Patent No. 3,009,908.

DETAILS OF PREPARATION AND USE OF ZIEGLER CATALYSTS

More detailed information will now be given on preferred procedures and components for preparing various Ziegler catalysts, and it will be understood that the procedures given herein with respect to use of a phenol will be followed. Ziegler catalysts, for whatever use desired, can be prepared in the vessel in which the catalyzed reaction is to be carried out, or can be prepared in one vessel and then transferred to the intended reaction vessel, and in either event, can either be used immediately after preparation or after a period of time elapses between the preparation of the catalyst and its subsequent use to catalyze, e.g., polymerization. If the catalyst is to be used after such a period of time, it is apt to lose activity during storage period and/or produce polymer of an increased molecular weight as compared with that produced with fresh catalyst and these disadvantages can be minimized by storing Ziegler catalyst at temperatures below about 10° C. and preferably below —25° C. for fairly long storage periods, as disclosed and claimed in the copending application of Robert J. McManimie, Harry G. Hurst, and Edward H. Mottus, Serial Number 586,352, filed May 22, 1956 and now abandoned. While Ziegler catalysts are often conveniently prepared at room temperature, they can be prepared at higher temperatures, and also certain advantages are obtained, including uniform catalyst activity over the course of a reaction period and more effective removal of catalyst residues if the catalyst is prepared at temperatures below about —25° C. as disclosed and claimed in the copending application of Robert J. McManimie, Harry G. Hurst, and Edward H. Mottus, Serial Number 586,353, filed May 22, 1956 and now Patent No. 3,065,220.

We prefer catalysts prepared by the interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminums, e.g., triethylaluminum, triisobutylaluminum, trioctylaluminum, with titanium tetrachloride.

Suitable aluminum compounds to be reacted with the chlorides, bromides and iodides of titanium or zirconium are those represented by the general formula $R_2AlX$ wherein R is an alkyl, cycloalkyl or aryl radical and X is hydrogen, halogen, or an alkyl, cycloalkyl or aryl radical. By way of example, but not limitation, the following compounds are mentioned:

triethylaluminum
triisobutylaluminum
trioctylaluminum
didodecyloctylaluminum
diisobutylaluminum hydride
tridodecylaluminum
diphenylaluminum bromide
dipropylcyclohexylaluminum
ditolylmethylaluminum
tri-($\beta$-phenylethyl)aluminum
diethylaluminum chloride
diisobutylaluminum chloride
diisobutylaluminum iodide
di($\beta$-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or of zirconium, the chlorides and iodides being preferred. The titanium or zirconium in these halides should be in a valence form higher than the lowest possible valence. The tetrahalides are especially preferred, although the dihalides; trihalides; mixtures of di-, tri-, and tetrahalides; etc.; can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, i.e., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mole ratio of aluminum compound to titanium (or zirconium) compound, or stated another and simpler way, the mole ratio of aluminum to titanium (or zirconium) can vary over a wide range, suitable values being from 0.1:1 to 10:1 on up to 15:1 or higher. It is generally preferred to use an Al:Ti mole ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, or vice versa, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied ethane, propane, isobutane, normal butane, n-hexane, the various isomeric hexanes, isooctane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane. In some instances, it is also advantageous to prepare the catalyst in the presence of a monomer; for example, if the catalyst is prepared in the presence of liquid ethylene and then used to polymerize ethylene, a high yield of polyethylene results.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example, from 5 to 30 parts by weight solvent per 1 part by weight total polymer produced. These inert solvents, which are solvents for the monomers, some of the catalyst components, and some of the polymers, but are non-solvents for many of the polymers, e.g., polyethylene, can also properly be termed inert liquid diluents or inert organic liquids.

The amount of catalyst required is dependent on the other variables of the particular reaction, such as polymerization; and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.001:1 and much lower values such as 0.0001:1 can sometimes be used.

The polymerization can be effected over a wide range of temperatures, again the particular preferred temperature being chosen in accordance with the monomer, pressure, particular catalyst and other reaction variables. For many monomers from room temperature down to say −40° C. and even lower are suitable, and in many cases it is preferred that the temperature be maintained at below about 35° C. However, for other monomers, particularly ethylene, higher temperatures appear to be optimum, say from 50 to 90° C. for ethylene. Temperatures ranging up to 150° C. and higher are generally satisfactory for Ziegler-type polymerization.

The pressure at which the polymerization is carried out is dependent upon the chosen monomer or monomers, as well as other variables. In most instances, the polymerization is suitably carried out at atmospheric pressure or higher. Subatmospheric pressures are permissible. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and, in some instances, on polymer quality. The choice of whether or not to use an appreciably elevated pressure will be one of economic and practical considerations, taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like. For this reason, suitable precautions should be taken to protect the catalyst and the reaction mixture from excessive contact with such materials. An excess of the aluminum compound tends to give a certain amount of protection against these poisons. The monomers and diluents or solvents, if used, need not be pure so long as they are reasonably free from poisons. However, best results are ordinarily obtained if the monomer feed contains at least 90 weight percent and preferably higher of the polymerizable monomer, exclusive of any solvent material. It is desirable to protect the catalyst during preparation, storage, and use by blanketing with an inert gas, e.g., nitrogen, argon, or helium.

The monomer or mixture of monomers is contacted with the catalyst in any convenient manner, preferably by bringing the catalyst and monomer together with intimate agitation provided by suitable stirring or other means. The agitation can be continued during the polymerization, or in some instances, the polymerization mixture can be allowed to remain quiescent while the polymerization takes place. In the case of the more rapid reactions with the more active catalyst, means can be provided for refluxing monomer and solvent if any of the latter is present, and thus remove the heat of reaction. In any event, adequate means should be provided for dissipating the exothermic heat of polymerization. If desired, the monomer can be brought in vapor phase into contact with the solid catalyst, in the presence or absence of liquid solvent. The polymerization can be effected in the batch manner or in a continuous manner such as, for example, by passing the reaction mixture through an elongated reaction tube which is contacted externally with suitable cooling medium to maintain desired reaction temperature; or by passing the reaction mixture through an equilibrium-overflow-reactor or a series of the same.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture or the polymer after separation from solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a nonsolvent, such nonsolvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

The foregoing principles and procedures can be applied, with suitable modifications when necessary, to reactions other than polymerizations, effected in the presence of Ziegler catalysts modified with a phenol in accordance with the present invention.

In order to illustrate some of the various aspects and advantages of the invention, the following examples are given. Ethylene has been chosen as a representative monomer, triisobutyl-aluminum has been chosen as a representative reducing agent in preparing the catalyst, titanium tetrachloride has been chosen as a representative polyvalent metal compound that is reduced in preparing the catalyst, kerosene, isooctane, hexane, etc., have been chosen as representative inert organic liquids for preparation of the catalyst dispersion and in which to carry out the polymerization. It will, of course, be understood that variations from the particular catalyst components, reactants, catalyst modifiers, solvents, proportions, temperatures and the like can be made without departing from the invention.

*Example 1*

To a 2-liter Morton flask equipped with a turbine agitator and containing a kerosene solution of triisobutyl aluminum; titanium tetrachloride catalyst, a solution of 15.1 m.moles phenol in 100 ml. kerosene was added. When the catalyst had aged a total of 15 minutes at temperatures of 25 to 69° C., and 3 minutes after the phenol addition, ethylene was admitted at a rate of 135 grams/hour with the stirrer at 2150 r.p.m. The atomic ratio of Al/Ti in the catalyst was 0.49, the concentration of the catalyst was 20 m.moles/liter of solvent, and the total amount of kerosene was approximately 1 liter. The polymerization was continued for 1 hour at 69–71° C., and 137 grams ethylene was absorbed. The polyethylene was separated from the reaction mixture and had a density of 0.946 at 25° C., melt index of 0.16 decigrams/minute at 190° C. (ASTM D–1238–52T), a recovery of 27% (measured as described in Example 3 below), and an Izod impact strength of greater than 15 ft.-lbs. per inch of notch on a compression molded sample. The good impact/flow relationship of this polyethylene was particularly notable.

*Example 2*

The procedure of Example 1 was employed except that the Al/Ti atomic ratio was 0.5, the amount of phenol was 20 mmoles, and the ethylene feed rate was 62 grams/hour. The resulting polyethylene had a density of 0.959 and a melt index of 4.16 decigrams/minute. The percent recovery was very low for so high a melt index, being only 47%; this is indicative of a good impact/flow relationship.

*Example 3*

To a nitrogen-purged, 1-liter, stainless steel, top-stirred autoclave containing 125 ml. of hexane (redistilled over $CaH_2$), 12.1 mmoles $TiCl_4$ in 50 ml. hexane, and 4.8 mmoles Al (isobutyl)$_3$ in 50 ml. hexane were added, both additions being followed by rinsing of the addition funnels with three 25-ml. portions of hexane. When the mixture has aged 5 minutes, 3.0 mmoles of phenol in 50 ml. hexane was added and rinsed in with three 25-ml. portions of hexane. After an additional 5 minutes' aging at 25° C., ethylene at 50 p.s.i. gage was introduced. Eighty grams of polymer was obtained in 7.5 minutes. The temperature range was 25–51° C. After the usual quenching and washing procedures, polymer was obtained which had a melt-index of 0.29 decigrams per minute at 190° C., a memory of 50% and an Izod impact strength of 2.3 ft.-lbs. per inch of notch.

The examples of catalyst preparations and ethylene polymerizations detailed in Table I illustrate operations employing the present invention under various conditions, and as a basis for comparison include control runs made under identical conditions but without employing the invention. The catalyst preparations designated as A, B and C in Table I are as follows:

*Method A.*—Add 125 ml. of polymerization media to the reactor. Add 50 ml. media to $TiCl_4$ to be used. Allow $TiCl_4$ solution to run into the reactor. Rinse in with three 25- ml. portions of media. Add 50 ml. media to $AlR_3$ and allow to run into the reactor. Rinse in with three 25-ml. portions of media. If phenol is added, the requisite amount of phenol solution is added to 50 ml. of media, then washed into reactor with three 25-ml. portions of media. If no modifier is used, 125 ml. of media is added to the reactor after addition of the $AlR_3$. The catalyst is normally aged 10 minutes from time of completion of addition of $TiCl_4$ and $AlR_3$. Phenol and other modifiers are not added until 15 minutes before start of polymerization.

*Method B.*—Concurrent streams of the $TiCl_4$ in 26/40 of the media and $AlR_3$ in 13/40 of the media are added to the reactor at 25° C. The rate of addition of the $TiCl_4$ stream is twice that of the $AlR_3$ stream. Addition is complete in 7 minutes. Heatup is started, bringing the mixture to 59° in the next 7 minutes. The requisite quantity of modifier as a 0.5 M solution, plus 1/40 of the media is then added (45 sec.). The polymerization is started at fifteen minutes' time from the start of addition of the $TiCl_4$ and $AlR_3$ solution.

*Methods C.*—To 30/40 of the polymerization media concurrent streams of $TiCl_4$ and $Al(i-Bu)_3$, each in 4.5/40 of the polymerization media are added over a seven-minute period. Heatup is started, bringing the catalyst suspension to 59° C. in the next seven minutes. The modifier solution (requisite amount of 0.5 M solution $+1/40$ of media) is then added and the polymerization is started at 15 minutes' aging time, measured from start of addition of $TiCl_4$ and $AlR_3$ solution.

The polymerization was conducted under the conditions designated in Table I, and the usual quenching and washing procedures were then utilized to obtain the polymer product. According to the usual procedure, ethylene flow was stopped, the reactor flushed with nitrogen, and the catalyst "quenched" by addition of anhydrous alcohol, e.g., isobutanol. The reaction mixture was then filtered to separate the suspended polyethylene from the liquid; the polyethylene was then worked up by heating in additional alcohol, e.g., isobutanol, filtered, washed with further amounts of the same alcohol and hexane and finally dried.

TABLE I

| Run | Catalyst Prepn. | Al/Ti Molar Ratio | Ti Concn. (m. moles/l.) | Modifier | Modifier/Al Molar Ratio |
|---|---|---|---|---|---|
| A | A | 0.4 | 20 | DTBPC (added at 5 min.) | 2.5 |
| Control | A | 0.4 | 20 | None | 0 |
| B | A | 0.4 | 24 | Phenol (added at 5 min.) | 0.25 |
| Control | A | 0.4 | 24 | None | 0 |
| C | B | 0.5 | 18 | Phenol (added at 14 min.) | 1.0 |
| Control | B | 0.5 | 18 | None | 0 |

| Run | Media | Catalyst Age (min.) | Polymerization Temp., ° C. | Pressure | Duration (min.) |
|---|---|---|---|---|---|
| A | Hexane | 10 | 21–50 | 32 p.s.i. | 69 |
| Control | do | 10 | 18–69 | 32 p.s.i. | 21 |
| B | do | 10 | 25–52 | 50 p.s.i. | 7.5 |
| Control | do | 10 | 25–62 | 50 p.s.i. | 4.5 |
| C | Isooctane | 15 | 65 | Atm. | 120 |
| Control | do | 15 | 65 | Atm. | 120 |

| Run | Density | Melt Index (dec./min.) | Recovery Percent | Impact Strength (ft.-lbs./inch) |
|---|---|---|---|---|
| A | 0.9463 | 0.71 | 48.8 | 1.1 |
| Control | 0.9460 | 0.12 | 56.0 | 1.6 |
| B | 0.9480 | 0.29 | 50.6 | 2.3 |
| Control | 0.9471 | 0.21 | 69.5 | 1.3 |
| C | 0.9461 | 0.18 | 23.2 | 12.7 |
| Control | 0.9494 | 0.04 | 91.5 | 0.47 |

| Run | $M_n$ | $M_w$ | $M_w/M_n$ |
|---|---|---|---|
| A | 15,000 | 70,000 | 4.6 |
| Control | 13,000 | 120,000 | 9.0 |
| B | | | |
| Control | | | |
| C | | | |
| Control | | | |

The aluminum alkyl employed in preparing the catalysts of Table I was Al(isobutyl)$_3$. DTBPC in the table refers to ditertiarybutyl-p-cresol. The impact strength of the polyethylene was determined by the Izod impact test which measures the energy necessary to break a notched specimen of the polymer when struck by a pendulum (ft.-lbs./in. of notch). The flow properties were determined (ASTM D-1238-52T) by forcing a molten polymer at a temperature of 190° C., through a small orifice, and reported as the melt index, i.e., the extrusion rate in grams polymer per 10 minutes (decigrams/minute). The percent recovery is a measure of the increase in diameter of the extruded polymer following its extrusion through the orifice; this value may also be termed "memory" or percent of memory. $M_n$ represents the number average molecular weight, and $M_w$ represents the weight average molecular weight.

For both the catalyst preparation and the polymerization the usual procedures were employed to thoroughly clean and dry equipment and it was then maintained free of oxygen and moisture by flushing with lamp-grade nitrogen.

It can be seen from Table I that in every case the use of a modifier according to the present invention improves the impact-melt index relationship of the polymeric product. Thus, in Run A the use of ditertiarybutyl-p-cresol resulted in great improvement in the melt index for some decrease in the impact properties. The phenol in Run B considerably improved both the melt index and the impact properties. In Run C both the melt index and impact properties were improved. It will be noted that the runs in Table I were successfuly conducted under various conditions of temperature, pressure, concentration, etc. It will also be noted that in every case the percent recovery was much smaller for the phenol-modified runs than for the other runs; this is a very strong indication of improved impact/flow properties.

*Example 4*

Utilizing the general procedure of Example 3, polyethylene was prepared by use of the catalysts and with the properties reported below:

TABLE II

| Al/Ti | Phenol/AlR$_3$ | Impact Strength (ft.-lbs./in notch) | Melt Index |
|---|---|---|---|
| 0.4 | 0.62 | 2.3 | 0.29 |
| 0.5 | 1.0 | 10 | Too hard. |

It appears that raising the phenol to aluminum triisobutylate ratio results in impact/flow improvement. However, because the use of higher phenol/AlR$_3$ ratios tends to deactivate the catalyst (which can be counteracted by the use of higher pressures), it will generally be preferred to use a phenol/AlR$_3$ ratio of about 1. The use of a 0.4 Al/Ti molar ratio appears to give better results than a 0.5 Al/Ti ratio.

*Example 5*

The data in Table III below illustrates another aspect of the invention involving the control of molecular weight of the polymer by varying the concentration of the modified aluminum triisobutyl titanium tetrachloride catalyst in the polymerization medium. The catalyst was prepared by method B in isooctane medium with an Al/Ti molar ratio of 0.5, a phenol/Ti ratio of 0.5, and had been aged 15 minutes prior to the polymerization, with the phenol being added at 14 minutes' age. The polymerization was conducted in a 5-liter Morton flask at 64-65° C. and atmospheric pressure at an ethylene feed rate of 48 grams per liter of solvent per hour for a period of two hours.

TABLE III

| Run | TiCl$_4$ Concn. (m. moles/l.) | Density | Impact Strength | Melt Index | Memory | Specific Viscosity |
|---|---|---|---|---|---|---|
| 1 | 10 | 0.9444 | 21.3 | Too hard | | Gel |
| 2 | 15 | 0.9443 | 15.6 | do | | Gel |
| 3 | 18 | 0.9467 | 5.6 | 0.47 | 39 | 0.160 |
| 4 | 21 | 0.9482 | 2.0 | 1.0 | 37.8 | 0.150 |

It can be seen that the specific viscosity decreases with increasing catalyst concentration (TiCl$_4$ concentration), while the density increases with increasing catalyst concentration. The specific viscosity of the polymer was determixed on a solution of 0.1 weight percent polymer in xylene at 100° C.

*Example 6*

The impact-flow relationships are affected by the concentration of catalyst (on the basis of TiCl$_4$ concentration) in the polymerization medium; higher catalyst concentrations generally give poorer impact-flow relationships. The catalyst utilized in the runs reported below was prepared according to the general procedure of Example 3, with an Al/Ti molar ratio of 0.4 and a phenol/Ti ratio of 0.25.

TABLE IV

| Run | TiCl$_4$ Concn. (m. moles/l.) | Temp. Range (° C.) | Duration (min.) | Impact Strength | Melt Index | Memory | Density |
|---|---|---|---|---|---|---|---|
| 1 | 24 | 25-51 | 7.5 | 2.3 | 0.29 | 51 | 0.9480 |
| 2 | 30 | 25-69 | 4.0 | 0.78 | 0.18 | 77 | 0.9497 |
| 3 | 24 | 25-37 | 18.0 | 11.5 | 0.02 | 21 | 0.9436 |
| 4 | 30 | 25-95 | 8.5 | 4.0 | 0.02 | 16 | 0.9451 |

The rate of polymerization increases with increasing catalyst concentration. The density also appears to increase with increasing catalyst concentration. For practical purposes catalyst concentrations in the range of about 10 to 30 mmoles Ti/liter are usually employed, although, of course, other ranges can be employed, e.g., from amounts less than about 5 to about 60 mmoles Ti/liter or even much greater amounts.

In another aspect, the present invention concerns the proper timing of the addition of the modifier to the catalyst to obtain the optimum impact-melt index properties. The data in the following table illustrates the effect of varying the time of addition of the phenol (in minutes from the start of the catalyst preparation) to a catalyst aged for one hour prior to the polymerization and having an Al/Ti ratio of 0.5 and a phenol to TiCl$_4$ ratio of 0.25. The catalyst was utilized in an isooctane medium at 24 mmoles/l., and the polymerization of the ethylene was conducted at 25-52° C. at 50 p.s.i.

TABLE V

| Run | Phenol Addition (Min. from Start of Catalyst Prepn.) | Approximate Polym. Rate, g./min. | Density | Impact Strength | Melt Index | Memory |
|---|---|---|---|---|---|---|
| A | 0 | 0.14 | 0.9416 | | | |
| B | 30 | 0.73 | 0.9412 | 19.9 | Too hard | |
| C | 50 | 7.6 | 0.9458 | 9.6 | 0.09 | 27 |
| D | 57 | 3.8 | 0.9465 | 9.1 | 0.08 | 37 |
| E | 59 | 4.3 | 0.9465 | 9.2 | 0.11 | 35 |

It can be seen that variation in the time of addition of the modifier from 1 to 10 minutes prior to start of polymerization (59 to 50 minutes from start of catalyst preparation) has essentially no effect on polymer. However, addition of the modifier more than 10 minutes prior to the start of polymerization tends to lower the activity of catalyst which is aged a total of one hour prior to the start of polymerization. The modifier should not ordinarily be added more than 10 minutes prior to start of polymerization.

Example 7

In order to determine the effect of pressure on the polymerization with the modified catalyst, a number of runs were made with the catalyst and according to the procedure of Example 6, but under varying ethylene pressures as recorded in Table VI.

TABLE VI

| Run | Ethylene Feed Pressure (p.s.i.g.) | Temperature Range | Run Duration (min.) | Polymer Properties | | |
|---|---|---|---|---|---|---|
| | | | | Density | Impact | M.I./Memory |
| A | 20 | 23–31 | 48 | 0.9451 | 5.4 | Too hard. |
| B | 27 | 22–31.5 | 47.5 | 0.9447 | 3.7 | 0.04/33. |
| C | 35 | 22.5–31 | 26.5 | 0.9435 | 10.4 | 0.05/28. |
| D | 42 | 24.5–35.5 | 17.5 | 0.9468 | 3.7 | 0.06/52. |
| E | 50 | 24.5–50.5 | 7.5 | 0.9480 | 2.3 | 0.29/51. |
| F | 57 | 25–49 | 8.0 | 0.9486 | 2.8 | Too hard. |
| G | 65 | 25–54.5 | 6.0 | 0.9483 | 2.9 | Too hard. |
| H | 150 | 20–79.5 | 2.5 | 0.9522 | 1.5 | Too hard. |

It can be seen that density increases with increasing pressure. Under this particular set of conditions, the impact-melt flow properties were best in the 25-50 p.s.i. range.

Example 8

Two catalyst component streams were fed concurrently into a reactor during a seven-minute period; one stream was composed of 72 mmoles $TiCl_4$ in 2600 ml. isooctane while the other was composed of 36 mmoles Al(isobutyl)$_3$ in 1300 ml. isooctane, the first stream being fed at twice the rate of the second. The reactor temperature was raised to 59° C. over the next seven minutes, and 72 ml. of 0.5 molar solution of phenol in isooctane was then added, followed by 100 ml. isooctane. At fifteen minutes' elapsed time (from the start of the addition), polymerization was started at an ethylene feed rate of 48 grams per hour per liter of reactor space at a temperature of 65° C. and continued for two hours. The properties of the polymers produced by several substantially identical runs were as follows:

TABLE VII

| Run | Density | Impact Strength | Melt Index | Recovery |
|---|---|---|---|---|
| A | 0.9475 | 11.9 | 0.44 | 25.0 |
| B | 0.9441 | 13.2 | 0.28 | 58.5 |
| C | 0.9455 | 12.1 | 0.29 | 36.6 |
| D | 0.9467 | 11.7 | 0.41 | 30.4 |

The process was reproducible with good impact-flow results.

Example 9

Twenty mmoles $TiCl_4$ was dissolved in 700 ml. Deobase kerosene in a 2-liter Morton flask, and 10 mmoles Al(isobutyl)$_3$ in 200 ml. Deobase kerosene was added with stirring in a 2- to 3-minute period. The mixture was gradually warmed to 70° C. over a 15-minute period. Ditertiarybutyl-p-cresol (Ionol), 10 mmoles, dissolved in 100 ml. Deobase kerosene was added at the 12-minute mark. Ethylene was admitted at the rate of 140 grams/hour/liter. The reaction was quenched by treatment with 100 ml. isobutyl alcohol for 15 minutes at 60 to 70° C. The polymer was separated by filtration at 70° C. and was washed on the filter with about 150 ml. isobutyl alcohol. The polymer was then slurried in 1 liter isobutyl alcohol, refluxed 15 minutes, separated from the hot mixture by filtration, and allowed to dry in open air. The polymer having a density of 0.9448 had a tensile strength of 3089 p.s.i. at yield, and 1922 p.s.i. at break. The percent of elongation at yield was 20, and at break was 682, which is remarkably high for a Ziegler-type low-pressure polyethylene. The flow-impact properties were also very good; the melt index was 1.3 decigrams/minute, and the Izod impact strength was 1.5 ft.-lbs.

Example 10

A run was made according to the procedure of Example 8 but utilizing 10 mmoles of m-cresol as modifier. The resulting polyethylene had a melt index of 1.6 decigrams/minute and an Izod impact strength of 0.94 ft.-lbs./inch of notch. Similar results can be obtained by utilizing ordinary cresol, also called cresylol or tricresol in either U.S.P. or technical grades, as the modifier in the above procedure; cresol is a mixture of o-, m- and p-cresols. The individual o- and p-cresols can also be employed in the above procedure.

Example 11

A catalyst was prepared according to the procedure of Example 9, except that it was permitted to age 20 minutes and at a final temperature of 65° C., and phenol added as a modifier was added at 15 minutes' age. Ethylene was admitted at full uptake rate (maximum, about 77.7 grams/liter/hour) and the polymerization was conducted at 65° C. The resulting polyethylene had a melt index of 0.32 decigrams/minute, and an incomplete break was obtained in the impact test (greater than 8 ft.-lbs./inch of notch); the density was 0.9464.

Example 12

Three-thousand ml. of redistilled isooctane was charged to a nitrogen-purged 5-1 Morton-type flask and the temperature adjusted to 25° C. To this well-agitated solution was added concurrently over a seven-minute interval 72 mmoles $TiCl_4$ in 450 ml. isooctane and 36 millimoles Al(iBu)$_3$ in 450 ml. isooctane. After addition was complete external heating was applied and the temperature adjusted to 59° over the next seven minutes. A solution of 36 mmoles phenol in 172 ml. isooctane was then added over a 40–50 second interval, during which the temperature increased to 60° C. Ethylene flow was started 15.0 minutes after the start of concurrent addition. After one minute, the ethylene flow was interrupted for six minutes during which time nitrogen was passed through the solution. Ethylene flow was then resumed at the same rate as before (48 grams/liter/hour) and polymerization was continued for two hours at 75° C. Conversion of ethylene was nearly quantitative. The polymer obtained possessed a density of .9478, a melt index of 1.5, and Izod impact strength of 2.3 ft.-lbs./inch of notch. The $M_n/M_w$ ratio of the polymer was 3.08 and the number average M.W. was 20,800. Film blown from this polymer was optically clear, a feature which was notably lacking in Ziegler polyethylenes prior to the present invention.

Example 13

A catalyst preparation and polymerization were conducted under conditions the same as those of Example 11, except that the ethylene flow was continuous for two hours without interruption. The resulting polyethylene had a melt index of 3.0 decigrams/minute and an impact strength of 1.2 ft.-lbs./inch of notch. Two additional runs yielded similarly good polymer having melt indices of 1.5 and 2.0 decigrams/minute. The three polymers were then blended together and pelleted, and film was blown on a one-inch extruder with film-blowing die for horizontal take-up. The resulting film of 1.5 mils thickness had good melt extensibility, high clarity, low grain, and good gloss. The see-through clarity was greater than 29 inches and no grain was visible in the film. Films of 0.5 mils and 2.5–3.0 mils gave similar values. The film was suitable for use as a packaging material and the like.

It has recently been discovered that the molecular weight distribution has a marked effect on properties of Ziegler polymers. If a normal Ziegler polyethylene is fractionated into various fractions according to molecular weight, i.e., low, medium, high, etc., it is found that some of the intermediate fractions having narrow molecular weight distributions possess good impact/flow properties. Such polymers have a median molecular weight, $M_n$, which approaches their average molecular weight, $M_w$, i.e., there are not a sufficient number of extremely high molecular weight species present to make the weight average molecular weight, $M_w$ (which gives weighted value to higher molecular weights) many times higher than the number average molecular weight, $M_n$ (which is not unduly influenced by higher molecular weights). It follows from the above that it is desirable to have a low $M_w/M_n$ ratio, approaching 1. Extensive fractionation of the polymers according to molecular weight would not ordinarily be economically feasible. However, the present invention makes such fractionation unnecessary as it will be noted that for those polymers herein in which $M_w/M_n$ value were determined, the ratios were very low, indicating a narrow molecular weight range. This provides an alternate method of defining the polymers produced by the process of the present invention. The phenol modifiers utilized in the present invention make it possible to obtain $M_w/M_n$ values less than 5, and often in the range of 3 to 2 or less. The $M_w$ and $M_n$ utilized herein were determined by calculation from distribution curves based upon viscosity measurements for the various polymer fractions; the method has been described in "Fractionation of Polyethylenes" by P. S. Francis; R. C. Cooke, Jr.; and J. H. Elliott (presented at the American Chemical Society spring meeting in Atlantic City, 1956).

It is not seen to be necessary to define the particular mechanism by which the phenol affects the catalyst and produces valuable results, and we do not wish to be bound by any theory concerning the same. However, the following theory is of interest as improving understanding of the invention. It appears that phenols act to minimize the reduction of $Ti^{+4}$ to $Ti^{+3}$ that normally occurs after polymerization is started; this apparently reduces the number of polymerization initiation sites available for polymerization, resulting in a higher $M_n$. A second action is apparently selective as to type of site since the amount of extremely high molecular weight species (associated with highly reduced Ti catalyst) is diminished as is evidenced by a reduction in $M_w$ values and the lack of gel. Thus, in certain broader aspects, the present invention concerns use of a modifier or poison for the purpose of minimizing the reduction of $Ti^{+4}$ to $Ti^{+3}$, $Ti^{+2}$, etc., with a view toward selectively reducing the initiation sites. For example, a few minutes after $Al(isobutyl)_3/TiCl_4$ catalyst has been prepared, the reduced titanium content, i.e., $TiCl_3$, may be about 30%, and this value may slowly rise during an ethylene polymerization to over 50% in two hours (in the absence of ethylene, it may rise to about 60% in the same period); however, when a suitable amount of phenol per se is added as modifier at 12 minutes' age, the percent of reduced titanium may slowly fall to about 10% in two hours during polymerization of ethylene; and in the absence of ethylene, the percent of reduced titanium may rise only very slowly, still being less than 40% at two hours.

As is implicit in the above discussion, it is believed that the present invention provides an effective means of controlling the concentration and type of catalyst, thereby providing a means of controlling the course of the catalyzed polymerizations.

In some respects, it appears that the impact/flow properties of Ziegler polyethylene are improved when the polymerization is conducted under moderate pressures above atmospheric pressure. It is ordinarily difficult to conduct a Ziegler polymerization under pressure because the rapid, exothermic reaction is difficult to control. In one aspect, the present invention can be considered as involving means of controlling or moderating the Ziegler polymerization under pressure and avoiding excessive heat build-up.

In addition to the procedures taught herein, phenols can be used in place of thiophenols in any of the procedures taught in the copending application of Harry M. Andersen, Serial Number 609,798, filed September 14, 1956.

While the invention has been described with particular reference to preferred embodiments thereof, it will be appreciated that variations from the details given herein can be effected without departing from the invention in its broadest aspects.

What is claimed is:

1. A method which comprises reacting triisobutylaluminum with titanium tetrachloride and then adding thereto phenol in an amount from 0.1 to 5 gram moles per gram atom of titanium.

2. The method of preparing high-density polyethylene which comprises polymerizing ethylene in the presence of a catalyst prepared by reacting $(Al(isobutyl)_3$ with $TiCl_4$ in a mole ratio of 0.3:1 to 0.8:1 in an inert organic liquid, and adding phenol in an amount to provide a phenol to Al molar ratio of about 1, the phenol being added within 10 minutes of the start of polymerization, the concentration of the catalyst being about 10 to 40 millimoles, calculated as Ti, per liter of organic liquid, and continuing the polymerization for a time sufficient to produce polyethylene having an Izod impact strength of at least 1 ft.-lb.

References Cited in the file of this patent

UNITED STATES PATENTS

| | | |
|---|---|---|
| 2,085,525 | Langedijk et al. | June 29, 1937 |
| 2,395,381 | Squires | Feb. 19, 1946 |
| 2,449,489 | Larson | Sept. 14, 1948 |
| 2,457,229 | Hanford et al. | Dec. 28, 1948 |
| 2,566,537 | Schmerling | Sept. 4, 1951 |
| 2,721,189 | Anderson | Oct. 18, 1955 |
| 2,820,775 | Chamberlain | Jan. 21, 1958 |
| 2,843,577 | Friedlander et al. | July 15, 1958 |
| 2,886,561 | Reynolds et al. | May 12, 1959 |
| 2,905,645 | Anderson et al. | Sept. 22, 1959 |
| 2,965,626 | Pilar et al. | Dec. 20, 1960 |

FOREIGN PATENTS

| | | |
|---|---|---|
| 538,782 | Belgium | Dec. 6, 1955 |
| 554,242 | Belgium | May 16, 1957 |